United States Patent
Kelly et al.

(10) Patent No.: US 11,388,575 B2
(45) Date of Patent: Jul. 12, 2022

(54) HEIGHT-FLOOR INDEXING FOR CALL ROUTING AND RESPONDER DETERMINATION

(71) Applicant: 911 Datamaster, Inc., Overland Park, KS (US)

(72) Inventors: Richard Kelly, Cedar Park, TX (US); James Shepard, Austin, TX (US)

(73) Assignee: 911 DATAMASTER, Overland Park, KS (US)

( * ) Notice: Subject to any disclaimer, the term of this patent is extended or adjusted under 35 U.S.C. 154(b) by 0 days.

(21) Appl. No.: 17/146,290

(22) Filed: Jan. 11, 2021

(65) Prior Publication Data

US 2021/0219123 A1 Jul. 15, 2021

Related U.S. Application Data

(60) Provisional application No. 62/958,994, filed on Jan. 9, 2020.

(51) Int. Cl.
| | |
|---|---|
| *H04W 4/90* | (2018.01) |
| *H04W 40/20* | (2009.01) |
| *H04W 4/024* | (2018.01) |
| *H04W 64/00* | (2009.01) |

(52) U.S. Cl.
CPC ............ *H04W 4/90* (2018.02); *H04W 4/024* (2018.02); *H04W 40/20* (2013.01); *H04W 64/006* (2013.01)

(58) Field of Classification Search
CPC ....... H04W 4/90; H04W 4/024; H04W 40/20; H04W 64/006; H04W 76/50; H04W 4/021; H04W 4/33; H04L 45/126; H04L 45/306
USPC .............. 370/329; 455/404.1, 428, 445, 450, 455/456.1–457, 521
See application file for complete search history.

(56) References Cited

U.S. PATENT DOCUMENTS

| | | | |
|---|---|---|---|
| 10,498,894 B1 * | 12/2019 | Mongrain | H04M 3/5232 |
| 2007/0041368 A1 * | 2/2007 | Lorello | H04L 67/18 |
| | | | 370/352 |
| 2007/0153986 A1 * | 7/2007 | Bloebaum | H04W 4/90 |
| | | | 379/45 |
| 2015/0312738 A1 * | 10/2015 | Deich | H04M 3/5116 |
| | | | 370/328 |

* cited by examiner

*Primary Examiner* — Michael Y Mapa

(57) ABSTRACT

A method to automatically alter the ECRF route determination for call delivery to a PSAP, and better identify the appropriate responders for incidents where significant elevation or height of the caller's location is involved. A pre-provisioned database for elevation and height consideration is provided either as part of or integrated with the ECRF based on the use of this additional sub-addressing data (building, height, etc.), and cross referenced to a pre-provisioned elevation or height associated with each specific building or floor. The routing of requests for emergency services through the use of either service provider delivered geodetic or civic location is provided. Emergency services routing and responder determination is based on both sub-addressing information in combination with a cross reference database of vertical height identifiers by accessing a pre-populated database of this cross-reference information.

10 Claims, 3 Drawing Sheets

Visual Representation for
H-FCRD Location Identification of Floor Using Height

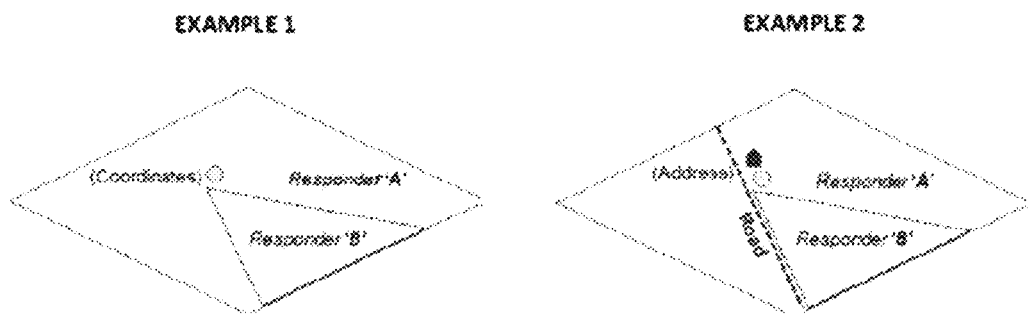
Fig. 1: Visual Representation
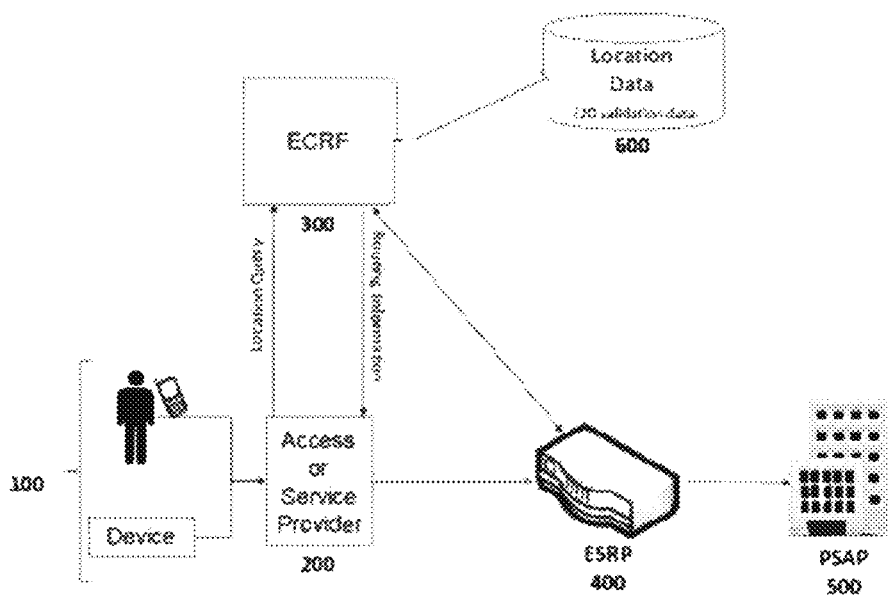
Fig. 2: Call Delivery

H-FCRD Database Example
| Address | Building ID | Building Floor | Floor Height | Ceiling Height |
|---|---|---|---|---|
| 105 Main St | A | 1st | 0 ft | 25 ft |
| 105 Main St | A | 2nd | 26 ft | 40 ft |
| 105 Main St | A | 3rd | 41 ft | 55 ft |
*Fig. 3: Database Design*
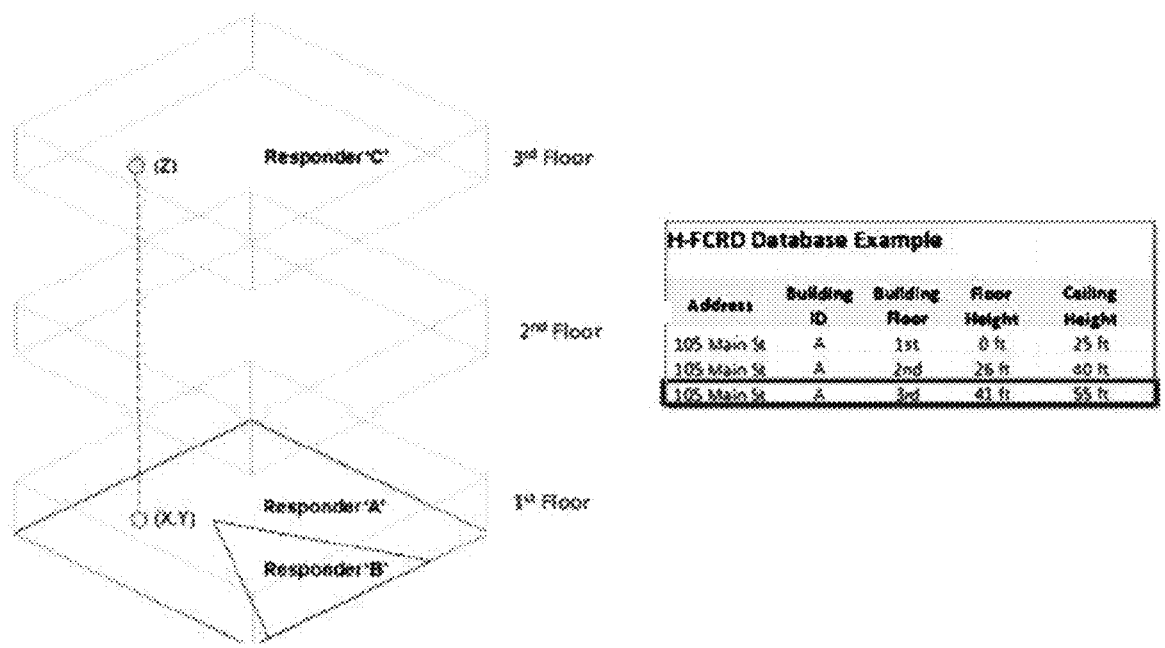
*Fig. 4: Visual Representation for H-FCRD Location Identification of Floor Using Height*

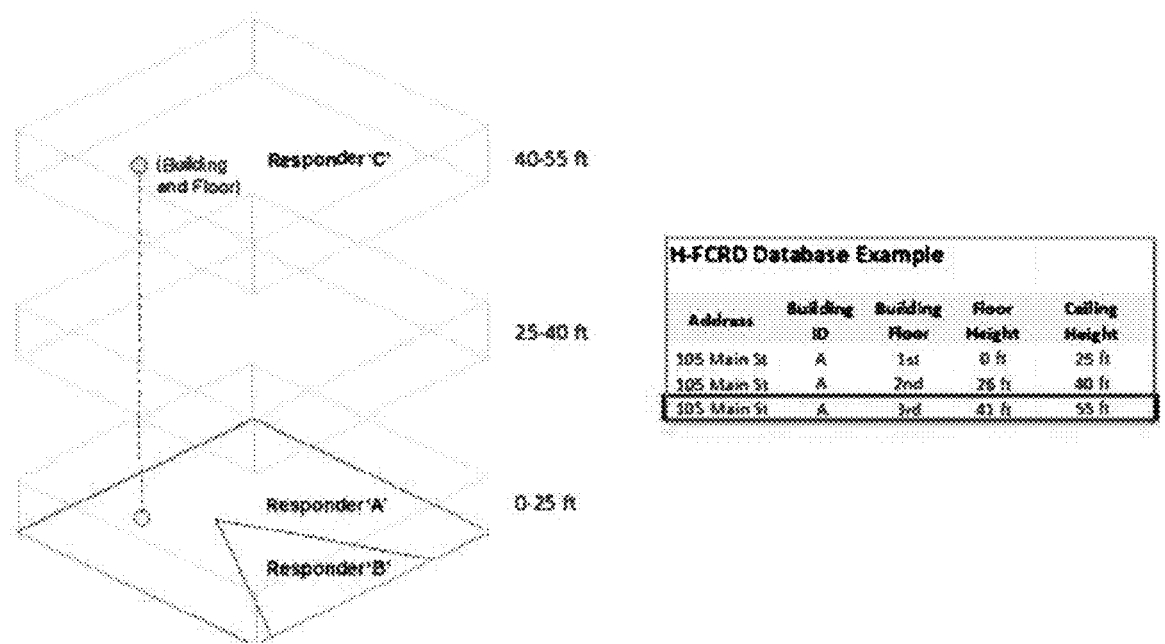
Fig. 5: H-FCRD Location Identification of Height Using Floor
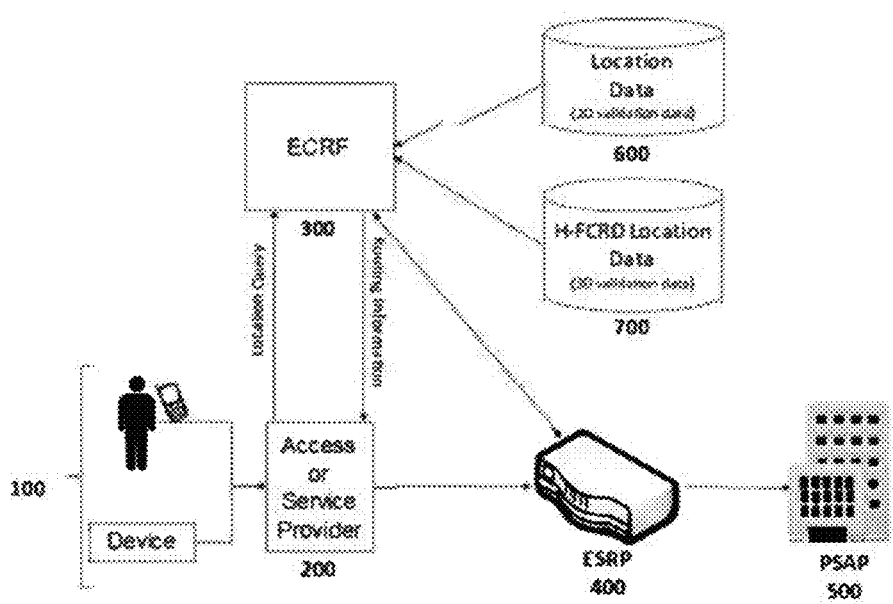
Fig. 6: Call Delivery for Elevation or Floor

HEIGHT-FLOOR INDEXING FOR CALL ROUTING AND RESPONDER DETERMINATION

CROSS REFERENCE TO RELATED APPLICATION

This application claims the benefit of application Ser. No. 62/958,994, filed Jan. 9, 2020, entitled HEIGHT-FLOOR INDEXING FOR CALL ROUTING AND RESPONDER DETERMINATION.

FIELD

The present invention relates to the routing of requests for emergency services through the use of either service provider delivered "geodetic" or "civic" location, and more particularly call routing in a Next Generation 9-1-1 environment when elevation plays a role using a specific cross floor-height reference in order to inform the call routing decision.

BACKGROUND

In today's emergency services environment (hereafter referred to as "9-1-1", although this invention is applicable to other dialing strings throughout the world), requests for emergency services (and hereafter referred to as "call routing" even though the request may not be a voice "call") are routed to Public Safety Answering Points (PSAP) based almost solely on the known or estimated location of the caller. Today, determining which PSAP a call should be routed to is based on two-dimensional data (i.e., no accounting for height/elevation). Specifically, 9-1-1 calls are routed based on either a base civic address location (e.g., "7500 College Boulevard, Overland Park, Kansas") that does not include sub-addressing information, or latitude and longitude coordinates (e.g., "38.929, -94.673") that do not support elevation or height. The call routing to a PSAP and recommendation of emergency responders today is decided by only referencing the provided base civic addresses, minus sub-addressing, or latitude/longitude, minus elevation or height consideration, to tabular data consisting of valid street names with associated address ranges or wireless tower/cell sector data, respectively.

Next Generation 9-1-1 (NG9-1-1) caller location for first responder identification and call routing to PSAPs, as well as emergency call taker action referencing during call handling operations, will depend upon accurate identification and conveyance of that location information as geodetic coordinates in the form of an X/Y/Z (including elevation) and/or a civic "dispatchable location" (i.e., sub-addressing including building and floor), as described by the Federal Communications Commission (FCC) in its Fourth Report and Oder effective Aug. 3, 2015 (DA/FCC #FCC-15-9, Docket/RM 07-114, FCC Record Citation 30FCC Rcd 1259 (2)).

This location information will be more precise for Public Safety as mandated by the FCC in their March 2015 memorandum 15-9, and supported by National Emergency Number Association (NENA), the Association of Public-Safety Communications Officials (APCO) and the major Commercial Mobile Radio Service (CMRS) providers. The elevation/height or "Z" component of GPS-derived location coordinates is currently available today from most service providers but is not being utilized for either call routing and service responder identification, or delivered to call takers in a PSAP, since there is no immediate necessity to provision this information for 9-1-1 operations. Additionally, local governments cannot utilize this information operationally unless changes are made in current Emergency Call Routing Function (ECRF) software and communications center applications, such as call taking software, map displays and Computer Aided Dispatch (CAD) systems. However, this more precise vertical caller location information will need to be processed by NG9-1-1 systems to improve current first responder identification and call routing capabilities.

In today's NG9-1-1 call routing and responder determination process for civic locations that include sub-addressing details, such as building and floor, or geodetic locations that includes elevation or height, there is no consideration for more specific vertical location metrics, nor is there an inherent ability in the ECRF as defined by industry standards to cross reference a given elevation or height with a specific building and floor, or vice versa. There is a need to alter the ECRF route determination for call delivery to a PSAP, and better identify the appropriate responders for incidents where significant elevation or height of the caller's location is involved.

SUMMARY

The present invention provides a method to automatically alter the ECRF route determination for call delivery to a PSAP, and better identify the appropriate responders for incidents where significant elevation or height of the caller's location is involved. A pre-provisioned database for elevation and height consideration is provided either as part of or integrated with the ECRF based on the use of this additional sub-addressing data (building, height, etc.), and cross referenced to a pre-provisioned elevation or height associated with each specific building or floor. The routing of requests for emergency services through the use of either service provider delivered "geodetic" (Z coordinate) or "civic" location as defined by the Internet Engineering Task Force (IETF), the Federal Communications Commission (FCC) and National Emergency Number Association (NENA) is provided. Emergency services routing and responder determination is based on both sub-addressing information (building, floor, etc.) in combination with a cross reference database of vertical height (Z coordinate) identifiers by accessing a pre-populated database of this cross reference information.

In effect, a caller location provided as a height (Z coordinate) would be cross referenced in this database and additionally expressed as a floor in a specific building, and a provided floor in a specific building would be additionally expressed as a height (Z coordinate), by accessing a pre-configured, cross-indexing database containing building floors and associated heights (Z coordinates) for each. This is in support of and supplemental to the NENA design considerations for what NG9-1-1.

BRIEF DESCRIPTION OF THE DRAWINGS

FIG. 1 "Two-Dimensional Validation and Routing Data—A Visual Representation" is a graphic representation of an example of a two-dimensional data set utilized for validation and call routing for either "geodetic" (X, Y) or "civic" (address) locations.

FIG. 2 "Two-Dimensional Validation and Routing—Call Delivery" is a graphic representation of the call flow for delivering an emergency services request using a standard, two-dimensional reference data set for either "geodetic" (X, Y) or "civic" (address) locations.

FIG. 3 "Three-Dimensional Validation and Routing Data—Database Design" is a graphic representation of the minimum required elements in an H-FCRD database to facilitate three-dimensional validation and call routing.

FIG. 4 "Three-Dimensional Validation and Routing Data—A Visual Representation for H-FCRD Location Identification of Floor Using Height" is a graphic representation of an example of a three-dimensional data set utilized for validation and call routing where the height ("Z" value) is present in the call location record and needs to equate to a "floor".

FIG. 5 "Three-Dimensional Validation and Routing Data—H-FCRD Location Identification of Height Using Floor" is a graphic representation of an example of a three-dimensional dataset utilized for validation and call routing where the floor (sub-addressing) is present in the call location record and needs to equate to a "height".

FIG. 6 "Three-Dimensional Validation and Routing—Call Delivery for Elevation or Floor" is a graphic representation of the call flow for delivering an emergency services request using a three-dimensional reference data set stored in an H-FCRD.

DETAILED DESCRIPTION

The invention provides a method for call routing in an NG9-1-1 environment when elevation plays a role. A specific cross floor-height reference database is provided and utilized in order to inform the call routing decision that the ECRF makes. Thus, elevation which has not been a factor in the automated ECRF decision making process before now plays an important part. While the prior art addresses elevation information with regard to collection or distribution, none of them address the necessity to affect the call and policy routing work the ECRF performs.

For an elevation/height represented by a "Z" value that is delivered to the ECRF (or any other element used for call routing and responder determination) for use in call routing and responder determination, where elevation impacts either or both determinations, the ECRF will access the pre-provisioned Height-Floor Cross Referenced Database (H-FCRD) to identify and utilize a numbered floor previously associated in the H-FCRD with this elevation/height.

Likewise, when a dispatchable location that includes sub-addressing (building and floor information) is delivered to the ECRF for use in call routing and responder determination, where the floor location impacts either or both determinations, the ECRF will access the pre-provisioned database H-FCRD to identify and utilize an elevation/height previously associated in the H-FCRD with this building and floor.

The pre-provisioned H-FCRD database of elevation/height information cross referenced for each floor is collected prior to call time via direct data uploads or through an on-line data management portal and stored in the H-FCRD for access by the ECRF. The degree of accuracy that the elevation/height must be searched within is ±3 meters (per FCC Fifth Report and Order and Fifth Further Notice of Proposed Rulemaking—PS Docket No. 07-114). This is the tolerance degree of uncertainty mandated by the FCC. Collection methods for floor-height data are outside the scope of this invention.

To identify the specific building a height/elevation is associated with the horizontal "X" and "Y" search must be constrained to that specific building location by using either an input building footprint polygon, which is a geometric representation dataset of the horizontal outline of the building in question (i.e., a GIS shape file or similar), or by a series of coordinate pairs (X and Y) of geometric dimensions (such as meets and bounds) that likewise represent the horizontal outline of the building in question to filter by.

Use of this H-FCRD cross reference-related tables capability by the ECRF will serve to tie floor heights to floor numbers and, vice versa, to support the use of either geodetic or civic address height/elevation information for enhanced call routing and responder determination when height/elevation factors impact these processes.

Referring to FIG. 1, Example 1, the location of a "geodetic" call that represents the longitude and latitude (X and Y, respectively) only requires the GIS depicted geographic boundary for the PSAP area of coverage to be able to determine which PSAP the call needs to be routed to. The ECRF makes this determination via a point-in-polygon intersect determination of the X and Y caller coordinates with the two-dimensional polygon that represents the area for which the appropriate PSAP should receive calls (in this example, PSAP 'A'). Once this determination is made by the ECRF, it utilizes the routing information attached to the intersected PSAP polygon (again, in this example PSAP 'A') to forward PSAP destination instructions to the ESRP to in turn allow that application to deliver the call to the ECRF-identified PSAP.

Referring to FIG. 1, Example 2, the location of a "civic" call that represents the base address of a structure (no sub-addressing) needs other GIS depicted geographic features, such as a road centerline or address point, to match to in order to be able to determine which PSAP the call needs to be routed to. The ECRF makes this determination via a point-in-polygon intersect determination of the address location match to the road centerline or address point with the two-dimensional polygon that represents the area for which the PSAP should receive calls (in this example PSAP 'A') Once this determination is made by the ECRF, it utilizes the routing information attached to the intersected PSAP polygon (again, in this example PSAP 'A') to forward PSAP destination instructions to the ESRP to in turn allow that application to deliver the call to the ECRF-identified PSAP.

Referring to FIG. 2, for an incoming call (100) an originating service provider (200) passes on the call with location information to the ESRP (400) that is seeking routing information to the appropriate PSAP. The ESRP then queries the ECRF (300) for routing instructions, based on the call location, using the Location-to-Service Translation (LoST) protocol. LoST provides a number of operations, centered around mapping locations and service Uniform Resource Names (URNs) to Uniform Resource Identifiers (URIs) and associated information. This protocol allows the routing instructions query to contain a civic location or a geodetic location. Using the LoST protocol one system may query another system about a specific location in order to receive either information on the validity of a location (LVF) or to obtain call delivery information (ECRF). This query can be formed to ask (a) whether the location is valid, or (b) where a call from the specified location should be routed for emergency services. The LoST specification specifically calls for the use of two-dimensional profiles for both validation and routing. Routing instructions are then determined using two-dimensional data from a database 600 accessed by the ECRF 300. Once the PSAP call routing instructions are determined by the ECRF 300, this information is returned to the ESRP 400, which then forwards the call and location information to the appropriate PSAP 500.

Referring to FIG. 3, the H-FCRD database is populated by data that reflects the base address of all multi-storied buildings for a given address. For each of these entries, sub-address information is included, such as a building identifier, floor, floor height and ceiling height.

Referring to FIG. 4, the location of a "geodetic" call that represents the longitude, latitude and elevation (X, Y and Z, respectively) may affect the PSAP and responders identified for the call location at that elevation. For example, a tall building with a call location in it at a height (Z value) between 41 and 55 feet may require the call to be sent to a secondary dispatch center that supports high-level responses above the 2nd floor. The same location at ground level may need to be sent to the primary dispatch center. For responders, the same holds true. The location on a 3rd floor may result in special response fire being the identified fire responder for that height location while for ground floor level it would be the standard fire responder. The H-FCRD informs the ECRF when elevation should be taken into account for call routing and responder determination when the ECRF queries the H-FCRD database.

Referring to FIG. 5, the location of a "civic" call that represents the base address along with sub-addressing (including a building and floor identifier) utilizes these location elements, along with the building outline, to derive not only what floor the caller is on but which PSAP to send this call to because of the elevation (floor) involved. In the example shown, the ECRF may need to route calls from the 3rd floor (or higher) to a PSAP with responders capable of getting to that location. The H-FCRD thus informs the ECRF when floor location should be taken into account for call routing and responder determination when the ECRF queries the H-FCRD.

Referring to FIG. 6, for an incoming call 100, an originating service provider 200 passes on the call with location information to the ESRP 400 that is seeking routing information to the appropriate PSAP 500. The ESRP 400 then queries the ECRF 300 for routing instructions, based on the call location, using the LoST protocol. This protocol allows the routing instructions query to contain a civic location or a geodetic location. Routing instructions are then determined using both two-dimensional data 600 and three-dimensional data in the form of the H-FCRD 700 accessed by the ECRF 300. Once the PSAP call routing instructions are determined by the ECRF 300, this information is then returned to the ESRP 400, which then forwards the call and location information to the appropriate PSAP 500.

A service provider 200 may send an emergency call to an ESRP 400 with a location object that contains either height/elevation (Z value) or dispatchable location (building and floor sub-addressing) that in turn informs the ECRF 300 on height as a factor that may alter a two-dimensional data only routing instructions determination. The ECRF 300 would then be able to return call routing instructions that would physically route the call differently because of the height/elevation factor. The effect of this is profound since it directs the emergency call to very different physical locations and could result in different emergency responder determination.

The present invention uses tabular data to allow a querying entity to obtain a response based on either a height/elevation ("Z" value) or a building and floor identifier (sub-addressing) that this response and the resulting call delivery may differ from the response based solely on a two-dimensional plane. "Z" values would then also be actionable at a PSAP when needing to take elevation into account for map display purposes.

The delivery of a request for emergency services based on query parameters are in addition to the standard two-dimensional location. A Location Validation Function (LVF) and/or ECRF may access an H-FCRD to respond to a validation or routing request based on a parameter in the originating query or known to the receiving LVF/ECRF that are in addition to a standard two-dimensional reference point. In the case of height/elevation, it is often represented in geographic information systems (GIS) as the "Z" value, whereas "X" and "Y" represent longitude and latitude, respectively. The response to a query may vary depending on the height/elevation and the underlying polygon, line, and/or point datasets used to resolve the query. The varying response may have a direct effect on the actual call delivery provided by an ESRP, based on ECRF routing recommendations to it, or similar routing devices. "Z" values could then be utilized for call routing to a PSAP when needing to take elevation into account, such as determining responder for a call on a bridge versus at water level, for example.

Delivery of a request for emergency services based on known parameters, defined by the available data, are in addition to the standard two-dimensional location. An LVF and/or ECRF may use multiple datasets to respond to a validation and routing request, respectively, based on a parameter known to the responding LVF/ECRF. These parameters may be discoverable by the LVF/ECRF through methods not specified here or be input by an administrator of the LVF/ECRF. The varying response may have a direct effect on the actual call delivery provided by an ESRP or similar routing device immediate cross referencing of civic-to-geodetic or geodetic-to-civic could now be accomplished when using user entered values for each floor's height (e.g., 0-30 ft=1st floor).

9-1-1 call takers and other first responders may invoke different emergency service responses based on the elevation location of the caller. For example, a 9-1-1 call coming from over a certain height may invoke the need for different rescue equipment.

9-1-1 call takers and other first responders may differentiate between multiple calls within the same building footprint based on the different elevations of the callers. Thus, for example, a 9-1-1 call dealing with a heart attack on the third floor is different from a near simultaneously received call for a heart attack on the 20 th floor and would require multiple responders to the same address.

9-1-1 call takers and other first responders may correlate calls within the same building. Thus, for example, a call for a fire on the 12th floor is possibly related to a call from the 13th floor regarding smoke in the hallway.

The present invention allows other NGCS elements to prioritize call taking. Thus, for example, after receiving multiple calls about smoke in a building, subsequent calls from the same building could be de-prioritized to a different call taking queue.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A method for multi-dimensional emergency call routing comprising:

receiving a request for emergency services from a service provider originating from a requestor;

providing a location for said requestor to query an emergency call routing function using a location-to-service translation protocol, wherein the location comprises coordinates;

determining call routing instructions from two-dimensional data and three-dimensional data by performing a point-in-polygon intersect determination in which the coordinates are compared to a building footprint polygon;

and wherein the three-dimensional data comprises both a ceiling height for a building floor and a floor height for the building floor;

receiving said call routing instructions;

and providing emergency routing services requests to an emergency service responder from said call routing instructions.

2. The method of claim 1 wherein said two-dimensional data is a civic location.

3. The method of claim 1 wherein said two-dimensional data is a geodetic location.

4. The method of claim 1 wherein said three-dimensional data includes a height-floor indexing for call routing and responder determination.

5. The method of claim 1 wherein said two-dimensional data is a civic location and said three-dimensional data includes a height-floor indexing for call routing and responder determination.

6. The method of claim 1 wherein said two-dimensional data is a geodetic location and said three-dimensional data includes a height-floor indexing for call routing and responder determination.

7. A method for multi-dimensional emergency call routing comprising:

receiving a request for emergency services from a service provider originating from a requestor;

providing a location for said requestor to query an emergency call routing function using a location-to-service translation protocol;

determining call routing instructions from two-dimensional data and a height-floor indexing for call routing and responder determination, wherein the height-floor indexing comprises both a ceiling height for a building floor and a floor height for the building floor;

receiving said call routing instructions; and providing emergency routing services requests to an emergency service responder from said call routing instructions.

8. The method of claim 7 wherein said two-dimensional data is a civic location.

9. The method of claim 7 wherein said two-dimensional data is a geodetic location.

10. A non-transitory computer-readable storage medium containing instructions that, when executed by one or more processors, perform a set of actions comprising:

receiving a request for emergency services from a service provider originating from a requestor;

providing a location for said requestor to query an emergency call routing function using a location-to-service translation protocol;

determining call routing instructions from two-dimensional data and a height-floor indexing for call routing and responder determination, wherein the height-floor indexing comprises both a ceiling height for a building floor and a floor height for the building floor;

receiving said call routing instructions; and providing emergency routing services requests to an emergency service responder from said call routing instructions.

* * * * *